(12) United States Patent
Shimpi et al.

(10) Patent No.: US 10,220,338 B2
(45) Date of Patent: Mar. 5, 2019

(54) ELECTRONIC FILTER DETECTION FEATURE FOR LIQUID FILTRATION SYSTEMS

(71) Applicant: CUMMINS FILTRATION IP, INC., Columbus, IN (US)

(72) Inventors: Abhijit Shimpi, Columbus, IN (US); Andry Lesmana, Columbus, IN (US); Gregory Hoverson, Columbus, IN (US); Rahul Kallurwar, Columbus, IN (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 195 days.

(21) Appl. No.: 15/028,595

(22) PCT Filed: Oct. 15, 2014

(86) PCT No.: PCT/US2014/060648
§ 371 (c)(1),
(2) Date: Apr. 11, 2016

(87) PCT Pub. No.: WO2015/057809
PCT Pub. Date: Apr. 23, 2015

(65) Prior Publication Data
US 2016/0296864 A1    Oct. 13, 2016

Related U.S. Application Data

(60) Provisional application No. 61/891,585, filed on Oct. 16, 2013.

(51) Int. Cl.
B01D 35/143    (2006.01)
B01D 35/18    (2006.01)
(Continued)

(52) U.S. Cl.
CPC ......... B01D 35/143 (2013.01); B01D 35/005 (2013.01); B01D 35/18 (2013.01);
(Continued)

(58) Field of Classification Search
CPC .... B01D 35/143; B01D 35/18; B01D 35/005; B01D 46/009; B01D 46/429;
(Continued)

(56) References Cited

U.S. PATENT DOCUMENTS 3,406,827 A * 10/1968 Topol .................... B01D 17/10
210/96.1
5,468,385 A * 11/1995 Inoue ................... B01D 17/045
210/243
(Continued)

OTHER PUBLICATIONS

International Search Report and Written Opinion for PCT/US2014/060648, dated Jan. 26, 2015, 12 pages.

*Primary Examiner* — Joseph W Drodge
(74) *Attorney, Agent, or Firm* — Foley & Lardner LLP

(57) ABSTRACT

An electronic system providing unique identification of a genuine filter system assembly to the engine control unit ("ECU"). A resistor is made to be an integrated part of the filtration system hardware such that when connected through a wired convection, the ECU detects a particular voltage signal and identifies the system as a genuine filter. The resistor could be integrated in any part of the filter system such that it could be used to recognize the filter or the cartridge. The resistor connection could be made via male/female pins, conducting wires, plates, conductive plastic material or other mechanisms.

25 Claims, 10 Drawing Sheets

(51) Int. Cl.
    *B01D 36/00*        (2006.01)
    *B01D 35/00*        (2006.01)
(52) U.S. Cl.
    CPC ...... *B01D 36/005* (2013.01); *B01D 2201/295*
                      (2013.01); *B01D 2201/296* (2013.01)
(58) Field of Classification Search
    CPC .......... B01D 2201/52; B01D 2201/295; B01D
                2201/29; B01D 29/60; B01D 35/14;
                B01D 2201/56; B01D 2201/291; B01D
                36/005; F01M 2013/0438; F01M
                2013/0477; F01M 13/04; F01M
                2011/0029; F02D 41/22; G06Q 30/018;
                G06Q 30/0185; G01N 27/02; G01N
                27/04; G01N 27/07; G01N 33/2847
    USPC .......... 210/85, 91, 282, 143, 149, 96.1, 295,
                210/299, 303, 799; 235/375, 376, 385;
                340/5.8, 10.1, 603, 604, 606, 607, 618
    See application file for complete search history.

(56)             References Cited

U.S. PATENT DOCUMENTS

| | | | |
|---|---|---|---|
| 6,533,926 | B2 | 3/2003 | Hawkins et al. |
| 6,537,444 | B2 | 3/2003 | Wilberscheid et al. |
| 6,558,444 | B1 * | 5/2003 | Hunter ................ B01D 46/003 55/385.1 |
| 7,615,151 | B2 | 11/2009 | Wieczorek et al. |
| 7,850,845 | B2 | 12/2010 | Wieczorek et al. |
| 8,580,023 | B2 | 11/2013 | Adams et al. |
| 9,072,992 | B2 * | 7/2015 | Mendel ................ B01D 35/143 |
| 9,279,780 | B2 * | 3/2016 | Gwin .................... B01D 36/005 |
| 9,403,110 | B2 * | 8/2016 | Gwin .................... B01D 35/143 |
| 9,453,754 | B2 * | 9/2016 | Wieczorek ........... B01D 36/005 |
| 9,649,853 | B2 * | 5/2017 | Baba ...................... B41J 29/393 |
| 2002/0144938 | A1 | 10/2002 | Hawkins et al. |
| 2005/0084256 | A1 | 4/2005 | Wieczorek |
| 2006/0151364 | A1 | 7/2006 | Hacker |
| 2009/0168753 | A1 * | 7/2009 | Campero .............. G01S 13/825 370/351 |
| 2010/0059431 | A1 | 3/2010 | Cho |
| 2010/0276352 | A1 | 11/2010 | Mendel et al. |
| 2010/0294021 | A1 * | 11/2010 | Makino .................. G01N 25/18 73/25.03 |
| 2011/0006878 | A1 * | 1/2011 | Nyffeler .............. G06K 19/0723 340/5.8 |
| 2011/0220560 | A1 * | 9/2011 | Verdegan ............. G06Q 10/06 210/90 |
| 2011/0259802 | A1 * | 10/2011 | Wieczorek ........... B01D 36/005 210/96.1 |
| 2012/0048794 | A1 | 3/2012 | Kovach et al. |
| 2013/0015109 | A1 * | 1/2013 | Holzmann ........... B01D 46/009 210/85 |
| 2013/0031963 | A1 * | 2/2013 | Ritchie, Jr. ......... G01N 33/2847 73/61.43 |
| 2013/0087114 | A1 * | 4/2013 | Joos ........................ F02P 19/02 123/179.21 |
| 2013/0285678 | A1 | 10/2013 | Gwin et al. |
| 2015/0047421 | A1 * | 2/2015 | Richardson .......... B01D 35/143 73/61.41 |

* cited by examiner

ELECTRONIC FILTER DETECTION FEATURE FOR LIQUID FILTRATION SYSTEMS

CROSS-REFERENCE TO RELATED APPLICATIONS

This application is a U.S. national stage application claiming the benefit of International Application No. PCT/US2014/060648, filed on Oct. 15, 2014, which claims priority to U.S. Provisional Patent Application 61/891,585, filed Oct. 16, 2013, and by Shimpi et al. The entire contents of these applications are incorporated herein by reference in their entirety.

FIELD

The present disclosure relates to filters, and more particularly to filters, assemblies, systems and methods for identifying installation of qualified filter elements.

BACKGROUND

U.S. Pat. No. 6,533,926, which is incorporated herein by reference in entirety, discloses a replaceable filter cartridge that includes an end plate having a data component electrically coupled to a pair of concentric circuit rings. The data component may include a sensor, data chip, or resistor and is configured to provide filtration information to a remote station when the filter cartridge is positioned within the housing of a filtration assembly such that the circuit rings connect with electrical contacts in the housing.

U.S. Pat. No. 6,537,444, which is incorporated herein by reference in entirety, discloses a replaceable filter cartridge that includes a filter element and an end plate bonded to an end thereof. The end plate includes at least two electrical contacts and a key way that includes a relief section. Upon proper installation of the filter cartridge into the housing of a filter assembly, a key attached to a centerpost of the housing is received in the relief section of the end plate and the electrical contacts thereof make contact with corresponding electrical contacts in the housing causing a data component to be energized. The data component may include a sensor, data chip, or resistor assembled to an exposed surface of the endplate.

U.S. Pat. Nos. 7,615,151 and 7,850,845, which are incorporated herein by reference in entirety, disclose filters with installation integrity that permit fluid flow only in a first installation condition and not in a second undesired or mis-installation condition, including improper alignment or mounting of a filter element in a housing, an incorrect replacement filter element, absence of a filter element, and an incorrect housing cover. A magnetically actuated valve has a piston controlling fluid flow according to installation condition.

U.S. Publication No. 2011/0259802, which is incorporated herein by reference in entirety, discloses a water sensor for a fuel filtration apparatus that includes a main body with at least one electrical contact disposed proximate the first end of the main body. The electrical contact(s) is operatively connectable to an electronic control unit. Multiple sensor contacts are disposed proximate a second end of the main body. The sensor contacts are configured to detect multiple water levels and provide an output on each water level detected. The electrical contact is configured to send the output to an electronic control unit. The water level information provided by the water sensor can be tracked by a control device to determine if the fill rate of water meets an alarm value.

U.S. Provisional Patent Application Ser. No. 61/355,401, which is incorporated herein by reference in entirety, discloses a run-safe filter system for confirming installation of a qualified filter element in a housing. An electrical switch has a first electrical condition in response to a qualified filter element being installed in the housing, and a second electrical condition in response to the absence of a qualified filter element installed in the housing.

U.S. Publication No. 2013/0285678, which is incorporated hereby by reference in entirety, discloses a filter assembly having a qualified filter element that filters fuel, a filter housing for the qualified filter element and a water-in-fuel sensor that senses presence of water in the filter housing. An electrical resistance of the water-in-fuel sensor changes based upon whether the qualified filter element is installed in the housing. A filter assembly can also have a plurality of magnetic elements disposed on at least one of the filter housing and the qualified filter element. A plurality of wires are disposed on at least the other of the filter housing and the qualified filter element. The control circuit determines that the qualified filter element is installed in the filter housing based on a change in electrical current in the plurality of wires.

SUMMARY

An electronic system providing unique identification of a genuine filter system assembly to the engine control unit ("ECU") is disclosed. A resistor is made to be an integrated part of the filtration system hardware such that when connected through a wired connection, the ECU detects a particular voltage signal and identifies the system as a genuine filter. The resistor could be integrated in any part of the filter system such that it could be used to recognize the filter or the cartridge. The resistor connection could be made via male/female pins, conducting wires, plates, conductive plastic material or any other means.

One embodiment relates to a filter assembly. The filter assembly includes a filter element configured to filter a fluid and a filter housing for the filter element. The filter assembly further includes an electrical circuit having a first portion located within the filter housing and a second portion coupled to the filter element. Installing the filter element in the filter housing electrically connects the first and second portions of the electrical circuit. The filter assembly includes a control circuit that determines whether the filter element installed in the housing is a designated type of filter element based upon a determined voltage of the electrical circuit.

Another embodiment relates to a filter assembly. The filter assembly includes a housing, a mounting boss coupled to the housing, and a sensor coupled to the housing. The sensor has a first electrical probe and a second electrical probe extending through the mounting boss and into an interior of the housing. The filter assembly further includes a resistor electrically connected to the first electrical probe and the second electrical probe such that the first electrical probe, the resistor, and the second electrical probe form part of an electrical circuit. The filter assembly includes a control unit that determines whether a first voltage across the first electrical probe and the second electrical probe is within a predetermined voltage band that indicates a genuine filter is installed within the housing.

A further embodiment relates to a filter assembly. The filter assembly includes a housing and a replaceable filter element positioned within the housing. The replaceable filter element has a filter media, a top endplate, a bottom endplate, and a resistor module. The resistor module includes a resistor electrically coupled to a first pin and a second pin. The filter assembly further includes a sensor coupled to the housing. The sensor has a first sensor probe and a second sensor probe. The first sensor probe contacts the first pin, and the second sensor probe contacts the second pin when the filter element is positioned within the housing. The filter assembly includes a control unit that determines whether a first voltage across the first sensor probe and the second sensor probe is within a predetermined voltage band that indicates the replaceable filter element installed within the housing is a genuine replacement filter element.

Another embodiment relates to a filter assembly. The filter assembly includes a housing and a replaceable filter element positioned within the housing. The replaceable filter element includes a filter media, a top endplate, a bottom endplate, and a resistor module. The resistor module has a resistor. The filter assembly further includes a heater coupled to the housing. The heater is configured to electrically heat a fluid to be filtered by the filter assembly. The heater includes a wiring harness in electrical communication with the resistor. The filter assembly further includes a control unit electrically coupled to the heater through the wiring harness. The control unit is configured to determine whether a first voltage across the resistor is within a predetermined voltage band that indicates that the replaceable filter element installed within the housing is a genuine replacement filter element.

A further embodiment relates to a filter element. The filter element includes a filter media, a top endplate coupled to a first end of the filter media, and a bottom endplate coupled to a second end of the filter media. The filter element further includes a resistor module. The resistor module includes a resistor electrically coupled to a first pin and a second pin. When the filter element is inserted into a housing of a filter assembly, the first pin and the second pin form an electrical circuit with a control unit such that the control unit can measure a voltage drop across the resistor.

Yet another embodiment relates to a filter element. The filter element includes a filter media, a top endplate coupled to a first end of the filter media, and a bottom endplate coupled to a second end of the filter media. The filter element further includes a resistor module including a resistor and a resistor module wiring harness. When the filter element is inserted into a housing of a filter assembly, the wiring harness forms an electrical connection with a heating element wiring harness such that a control can measure a voltage drop across the resistor via the heating element.

These and other features, together with the organization and manner of operation thereof, will become apparent from the following detailed description when taken in conjunction with the accompanying drawings, wherein like elements have like numerals throughout the several drawings described below.

DETAILED DESCRIPTION

The concept of filter detection is based on simple Ohm's law. The key idea is to integrate a known value of resistance ($R_{Filter}$) in the filtration hardware such that the ECU can detect a particular voltage value ($V_{Filter}$) when connected electrically with the filter hardware.

$$V_{Filter} = I \times R_{Filter} \quad (1)$$

In order to detect $V_{Filter}$, an electrical connection between the filter resistor and the ECU is formed. As part of the filter detection logic, when the ECU senses a voltage outside the voltage band corresponding to the filter resistance, it detects absence of a genuine filter system. In such a case, the ECU may decide to set off a fault code, notify the operator through a malfunction indicator lamp (e.g., a dashboard light), derate the engine, or howsoever it may choose to respond. Different ways of achieving resistor based recognition are discussed in further below. The designs are shown as example application of the concept to a fuel-water separator, lube/fuel filter and cartridge style filter assembly.

Figure 1A:
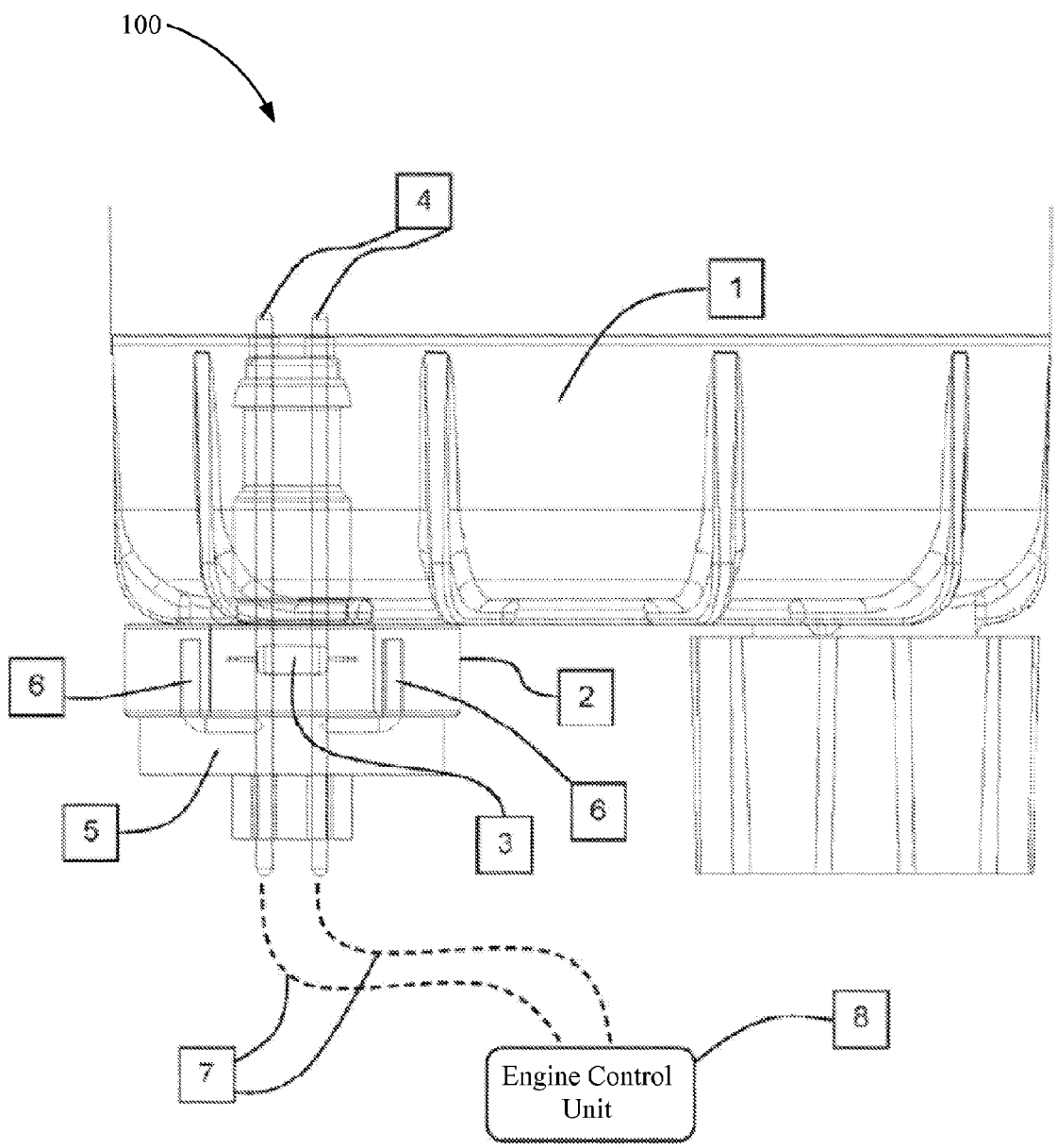
FIGS. 1A through 1C are views of a fuel-water separator assembly having a resistor-based electronic filter recognition feature according to an exemplary embodiment.

Referring to FIG. 1A, a lower side view of a fuel-water separator assembly 100 having a resistor 3 integrated with a water-in-fuel ("WIF") sensor is shown according to an exemplary embodiment. The resistor 3 is integrated in the body of a fuel-water separator assembly 100. The resistor 3 is permanently attached inside the mounting boss 2, which is an integral part and extension of the fuel-water separator shell 1. A WIF sensor consisting of electrical probes 4, a body 5 and probe extensions 6 is shown attached to the mounting boss 2, and therefore to shell 1. Any type of resistor can be permanently attached inside the mounting boss 2 by using various methods.

Figures 1B, 1C:
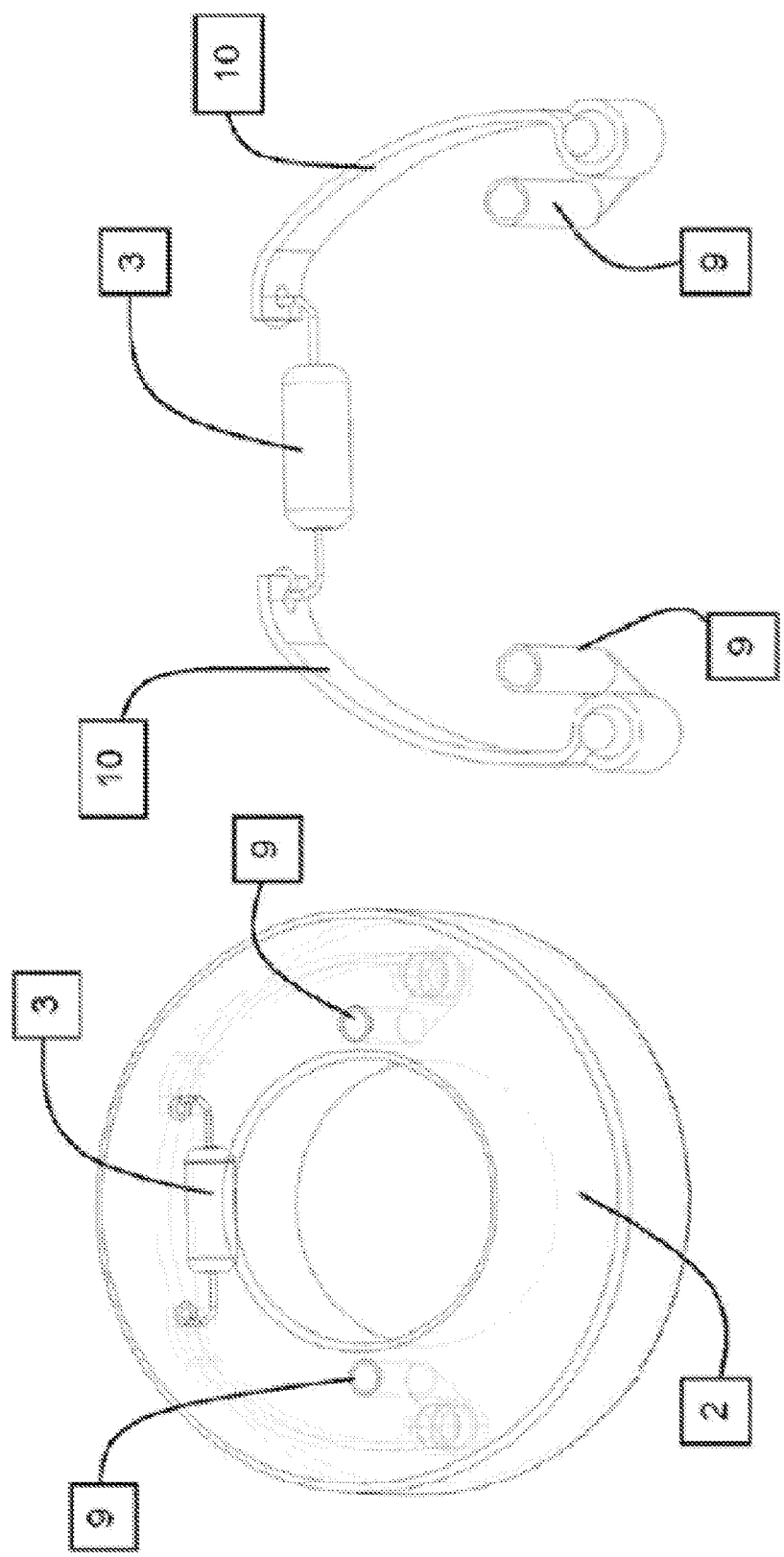

One such attachment arrangement is detailed in FIG. 1B, which shows a perspective view of the mounting boss 2. The wires of the resistor 3 are connected to two bent metal conducting plates 10 through screws, winding, soldering or any connection method which establishes an electrical contact. The metal conducting plates 10 in turn, are connected to two pin slots 9 that, when integrated with the mounting boss 2 of the filter shell 1, act as female electrical connection ports. FIG. 1C shows the resistor 3, the conducting plates 10, and the pin slots 9 separated from the mounting boss 2. The extension probes 6 of the WIF sensor, act as male connectors which attach to the female connections ports 9. Upon installation of the WIF sensor to the fuel-water separator assembly, an electrical connection is established between the sensor probes 4 and the resistor 3.

Referring again to FIG. 1A, during engine operation, the WIF sensor is connected to the ECU 8 with wiring harnesses 7 such that, when the ECU is powered on, it forms an electrical circuit with the resistor 3 built into the filter body 1. The voltage measured across the sensor probes 4 is used by the ECU 8 to detect a particular range of voltage to identify that a genuine filter is installed on the engine (i.e., the voltage drop across the resistor 3). At the same time, another voltage band across the sensor probes 4 is used by the ECU to detect presence of water-in-fuel (e.g., the presence of accumulated water within the shell housing 1) and indicate to the operator that the filter is due to be drained for water. Accordingly, The filter recognition feature is provided using an existing electrical connection through the WIF sensor installed in fuel-water separators.

Figure 2A:
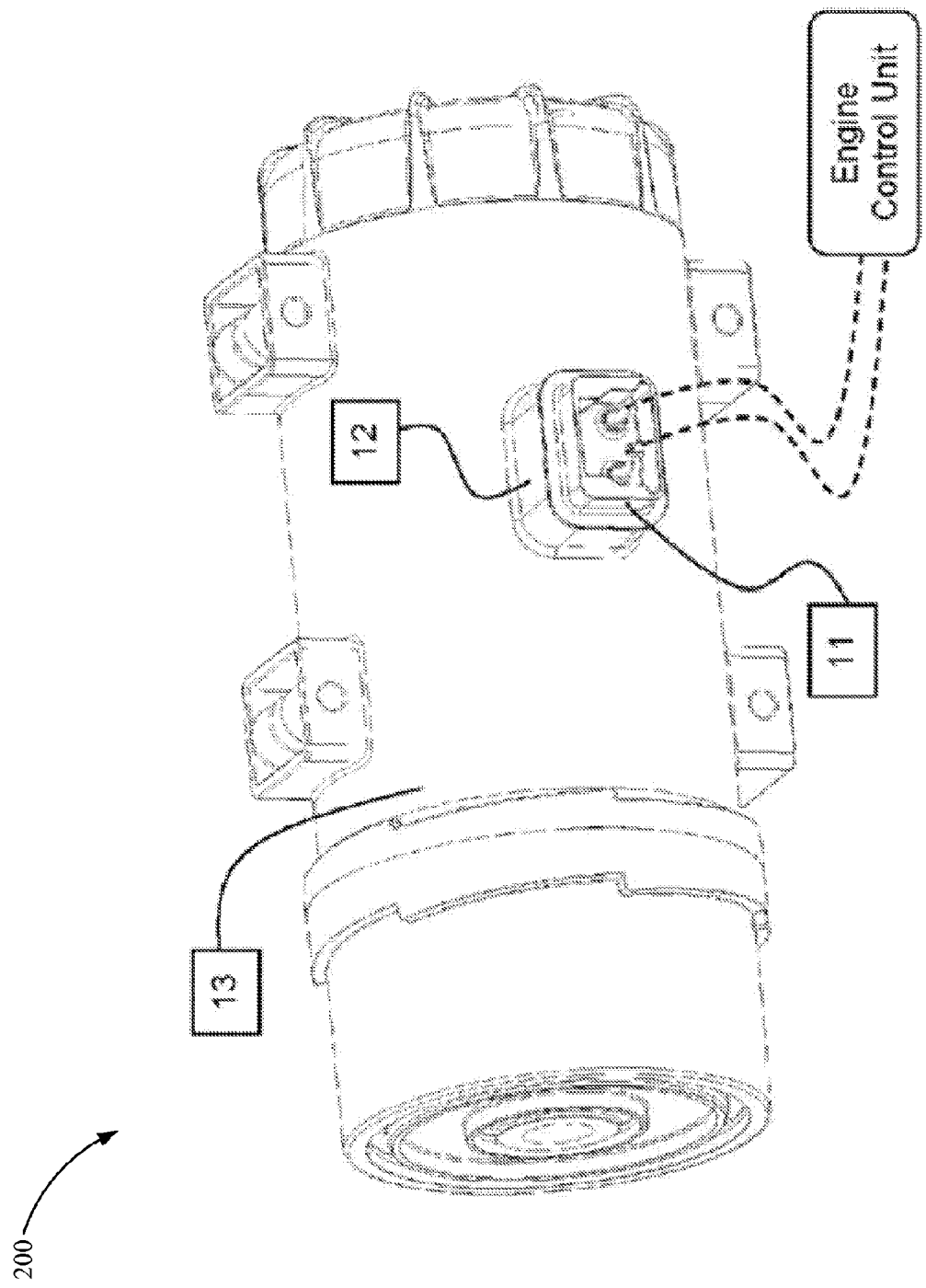
FIGS. 2A through 2C are views of a filter assembly having a resistor-based electronic filter recognition feature according to another exemplary embodiment.

Referring to FIG. 2A, a perspective view of a filter assembly 200 is shown according to an exemplary embodiment. The filter assembly 200 includes a resistor-based filter recognition system. The filter assembly 200 may be liquid filtration assembly (example—lube filters, fuel-filters, hydraulic filters, etc.) that does not have an existing WIF sensor connection to the ECU (i.e., as shown above with respect to the fuel-water separator 100). The filter assembly 200 includes a recognition module 11 permanently attached to the filter body 13 via a mounting boss 12. The recognition module 11 can be attached on the top, bottom, or to the side of the filter body 13.

Figure 2C:
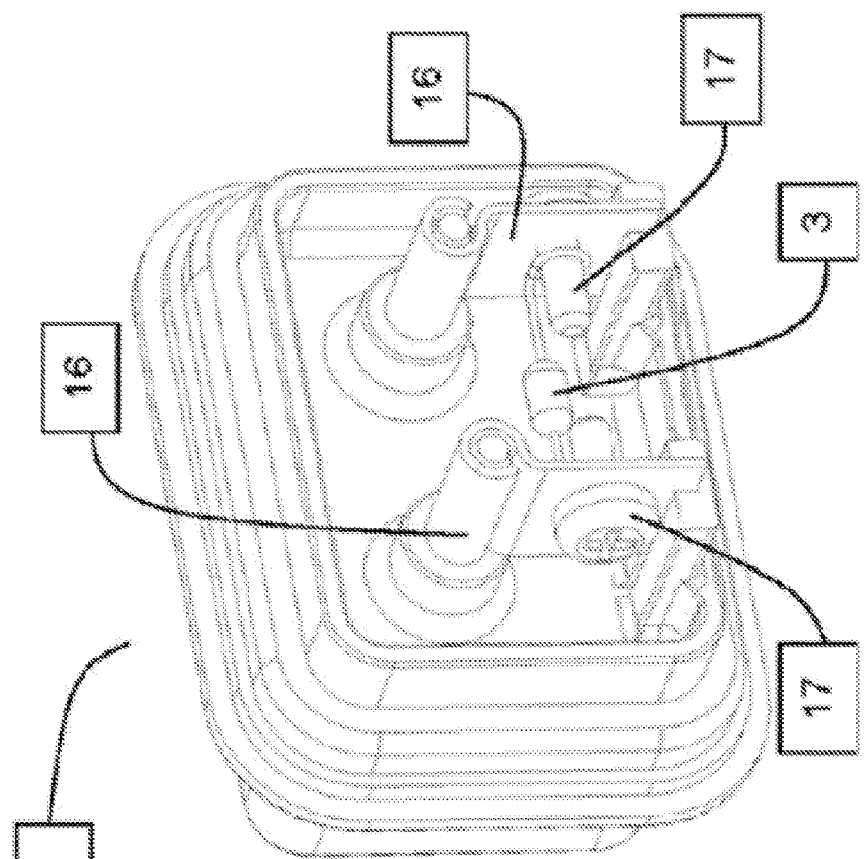
Figure 2B:
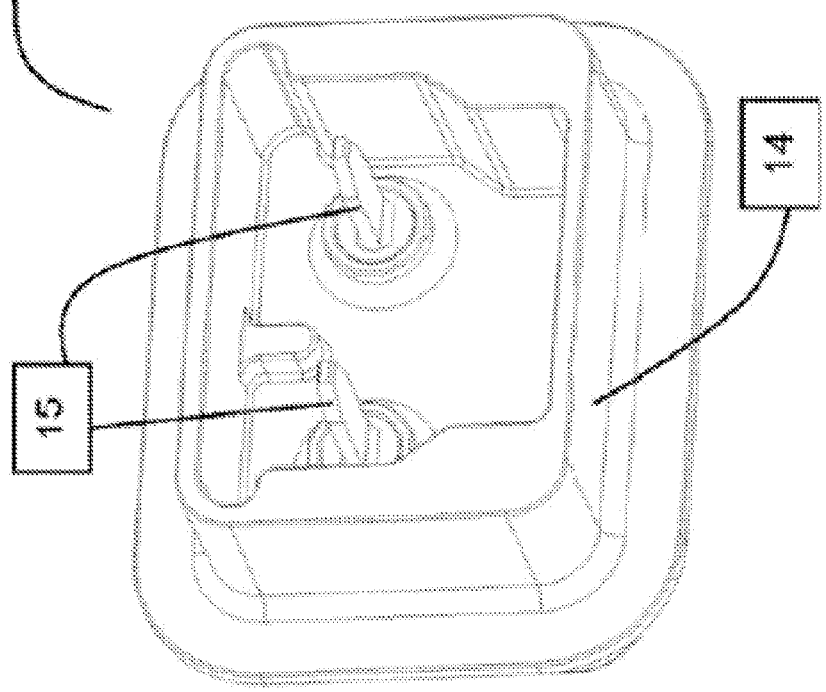

FIG. 2B shows a front perspective view of the recognition module 11. FIG. 2C shows a back perspective view of the recognition module 11. Although shown as being constructed in a rectangular form, the recognition module 11 can be constructed in many forms and shapes, one of which in rectangular form. The recognition module 11 consists of a body 14 through which two pins 15 extend and are provided to form an electrical connection to the ECU. In some arrangements, the body 14 is made of plastic. The pins 15 may be male or female pins. As shown in FIG. 2B, the pins 15 are male pins. As shown in FIG. 2C, on the back side of the recognition module 11, the pins 15 are in turn connected to a resistor 3 of a particularly chosen resistance value through metal plates 16 and screws 17. The plates 16 and the screws 17 type connection is shown only as an example. Other connection types (e.g., wired, soldered, wound, clipped, etc.) can be used to connect the resistor 3 to the pins 15. The recognition module 11 is permanently attached to the filter body 13 such that when the filter assembly 200 is in an installed position and the ECU is connected to the pins 15, the ECU system can detect the voltage drop across the pins 15 caused by the resistor 3. If the voltage drop across the pins 15 is within the designated voltage drop of a genuine filter, the ECU determines the filter assembly 200 to be a genuine filter.

Figure 3A:
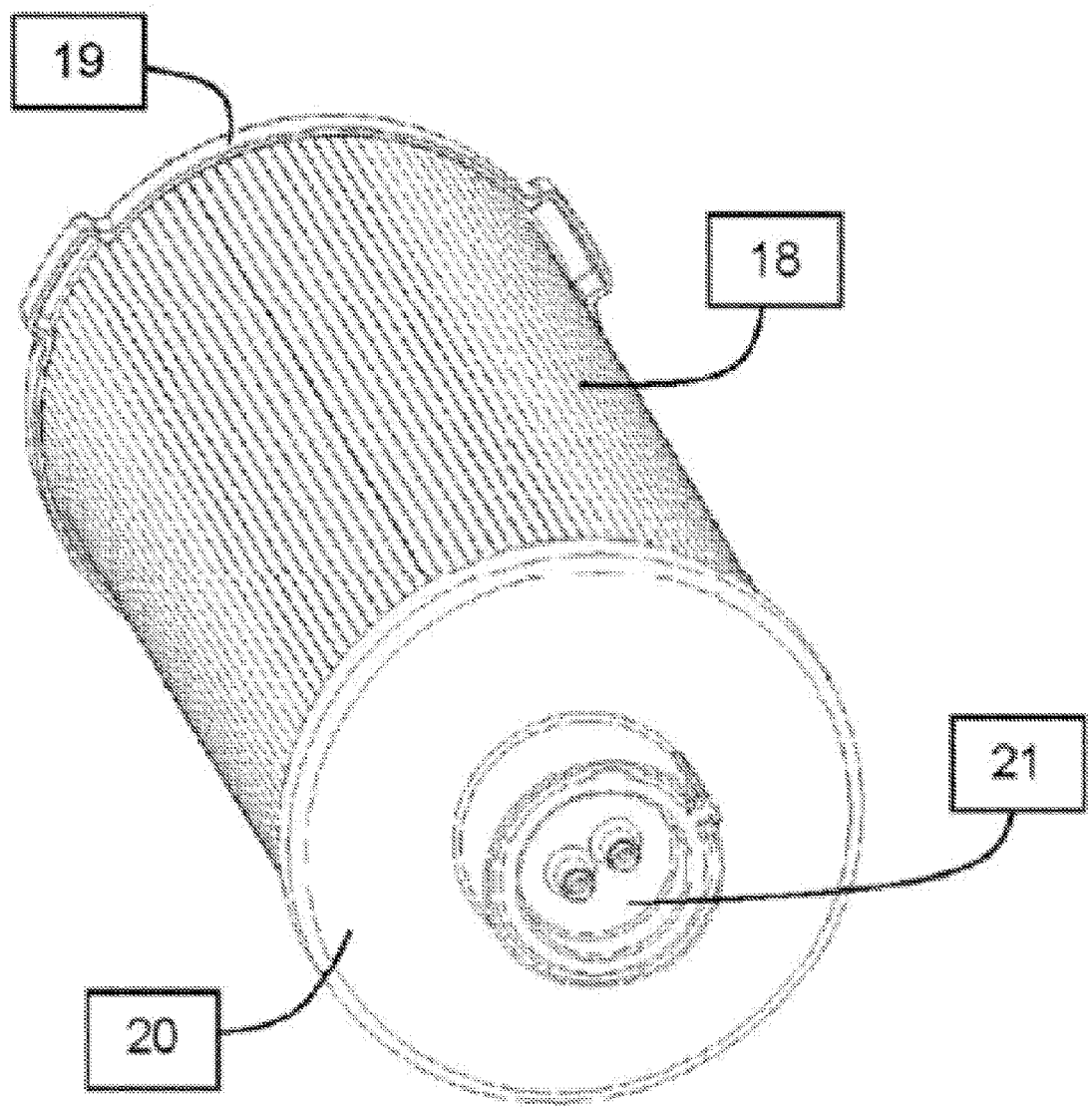
FIGS. 3A through 3D are views of a filter element a resistor-based electronic filter recognition feature.
Figure 3B:
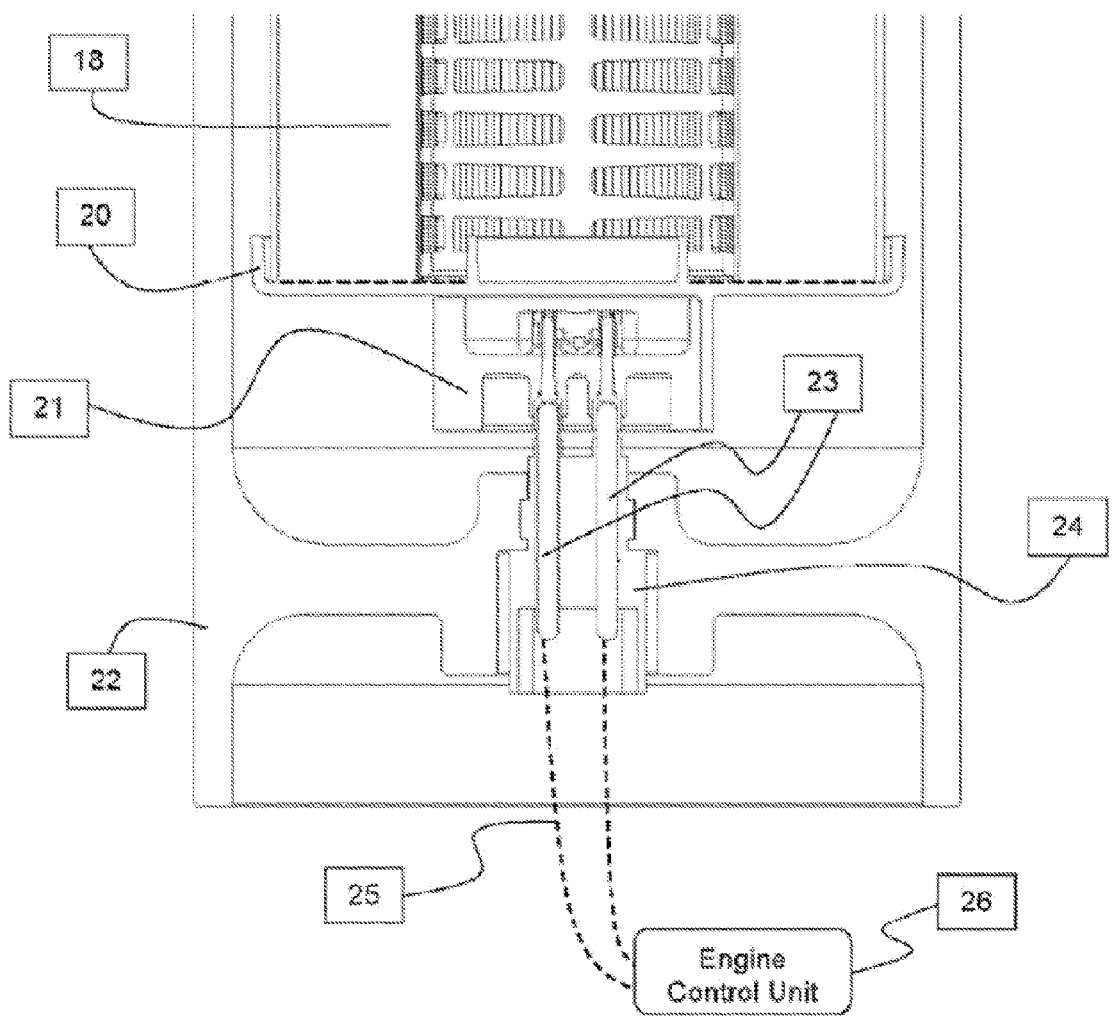

Referring to FIG. 3A, a perspective view of a filter element 18 having a resistor-based electronic filter recognition feature is shown according to an exemplary embodiment. The filter element 18 is a replaceable filter element for a serviceable filter assembly. As described in further detail below, the resistor 3 can be integrated in either the top endplate 19 or the bottom endplate 20 of the filter element 18. The top end plate 19 and the bottom endplate 20 seal a clean side of the filter media making up the filter element 18 from a dirty side of the filter element 18. In alternative arrangements, the resistor 3 may be positioned at another location on the filter element 18. The electrical connection from the resistor 3 to the ECU can be made through various connection means, such as a wired connection. To provide examples of different types of wired connections, two arrangements are presented. A first arrangement is presented in FIGS. 3A-3D. The first arrangement shows the filter element 18 with the resistor 3 attached permanently to the bottom endplate 20. In the arrangement of FIGS. 3A-3D, an electrical connection is made between the ECU through a WIF sensor. A second arrangement is presented in FIGS. 4A-4D. The second arrangement shows the resistor 3 built into a top endplate, with the electrical connection made between the ECU and the resistor 3 through a fuel-heater.

Figures 3C, 3D:
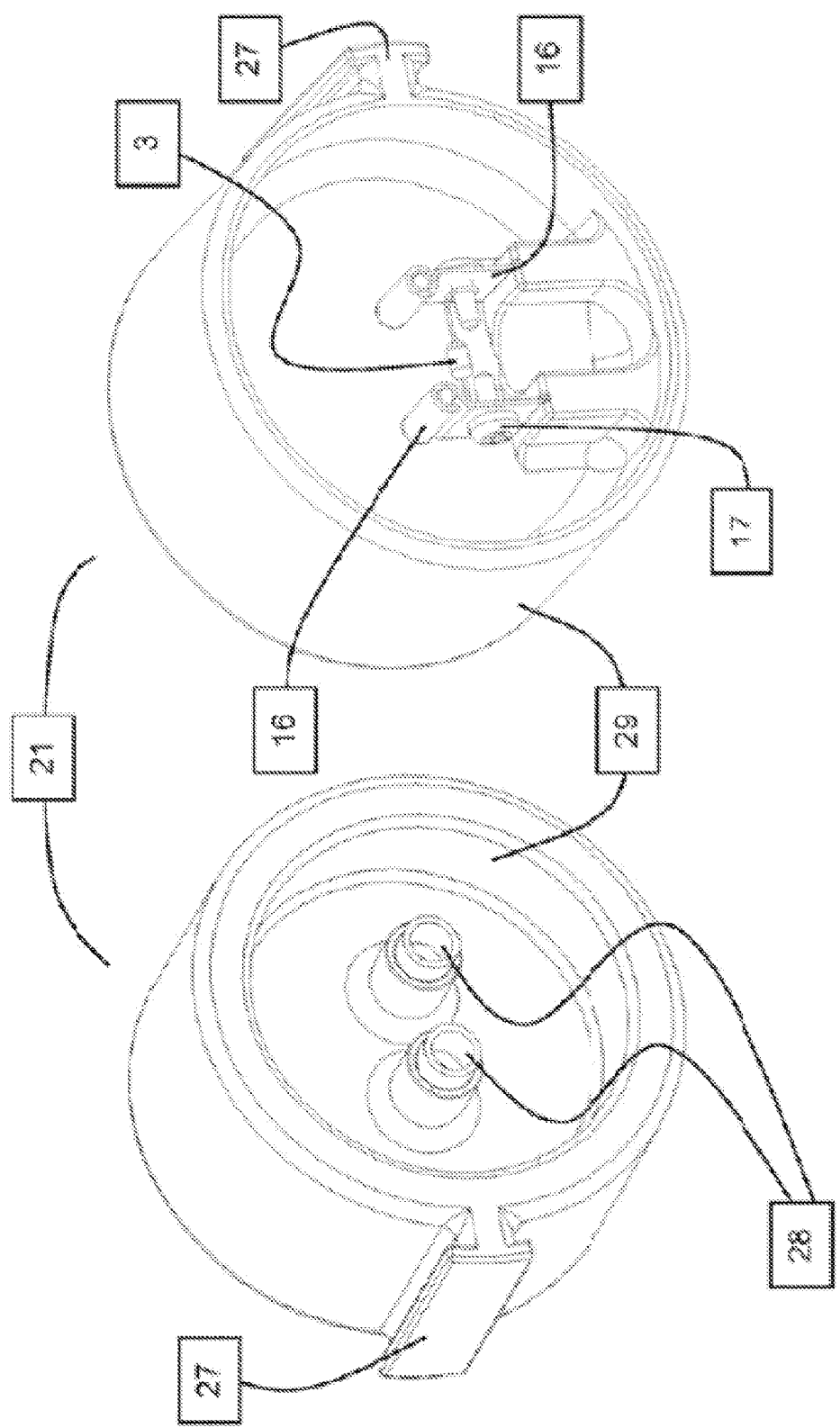

Referring to FIGS. 3A-3D, the cartridge filter element 18 includes a top endplate 19 and a bottom endplate 20. An electronic filter recognition module 21 is integrated with the bottom endplate 20. As discussed above, the resistor based recognition module 21 can be of any form, shape and size, in this particular instance, a round shaped module 21 is used as shown in FIG. 3C. The module 21 consists of the resistor 3 attached to conducting plates 16 via screws 17 and housed inside a round shaped plastic module body 29. This method of construction is similar to the one described in FIG. 2B, however, in this case female pins 28 are used. The plates and screws type connection is shown only as an example, however, any type of connection (example—wired, soldered, wound, clipped, etc.) can be used to connect the resistor 3 to the pins 28. The module 21 is an integral part of the bottom endplate 20 and therefore, of the filter element 18. Such filter element 18 is shown assembled in an example filter housing assembly in FIG. 3B, where a sensor 24 with sensing probes 23 is attached to the bottom of the filter shell body 22. This sensor 24 could simply be the water-in-filter sensor in cases of fuel-water separators with cartridge elements or a simple filter recognition sensor in cases of lube/fuel/hydraulic filters, etc. with cartridge elements. Upon installation of the cartridge filter element 18 into the shell body 22, the female pins 28 of the recognition module 21 connect to the male sensor probes 23 which in turn are connected to the engine control unit 26 via wiring harnesses 25. Upon providing electrical power, the ECU 26 can detect the voltage drop (e.g., a voltage range) across the connection pins 28 and detect the presence of a genuine filter cartridge 18 as described above.

Figure 4A:
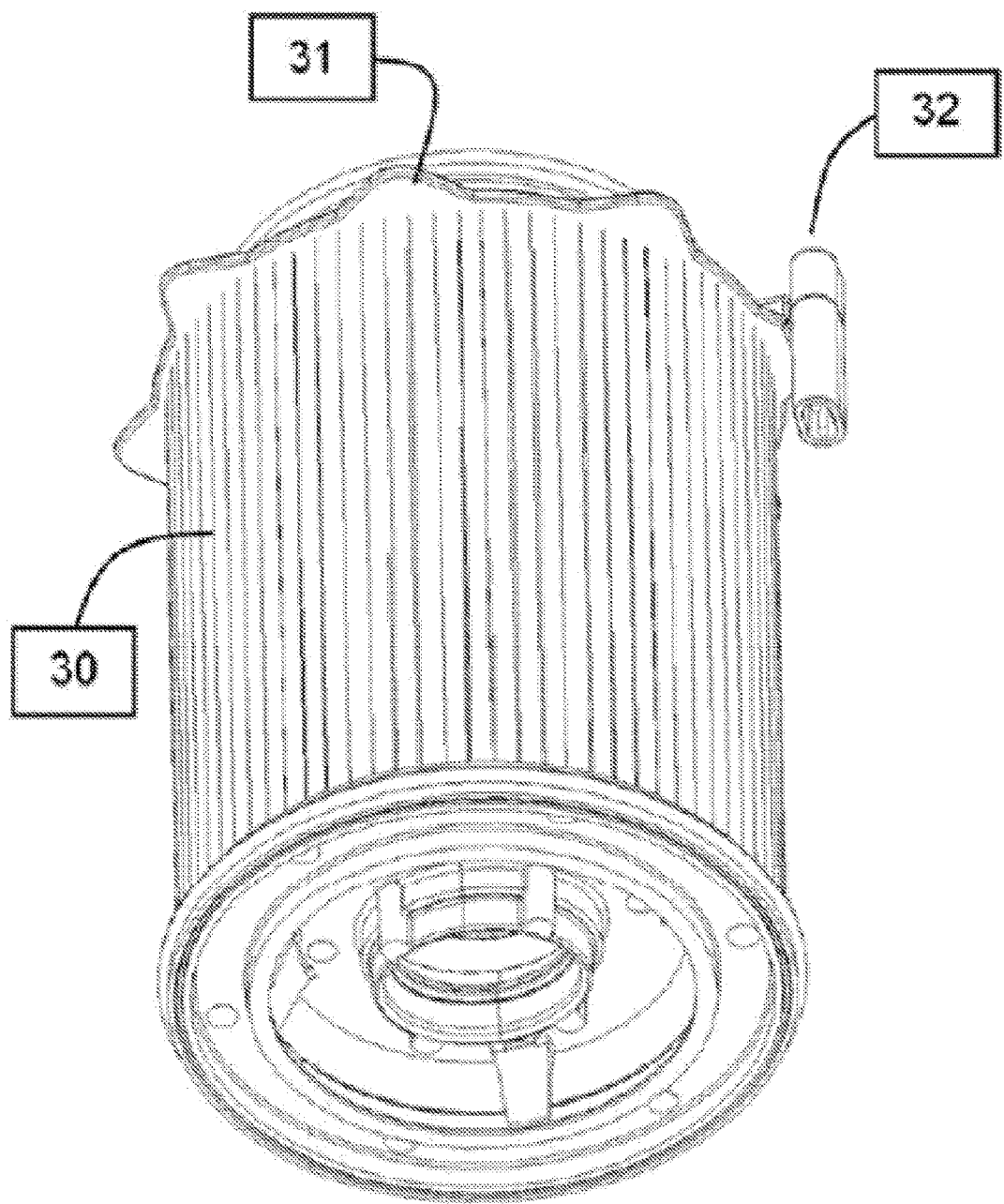
FIGS. 4A through 4D are views of a filter element having a resistor-based electronic filter recognition feature according to another exemplary embodiment.
Figure 4C:
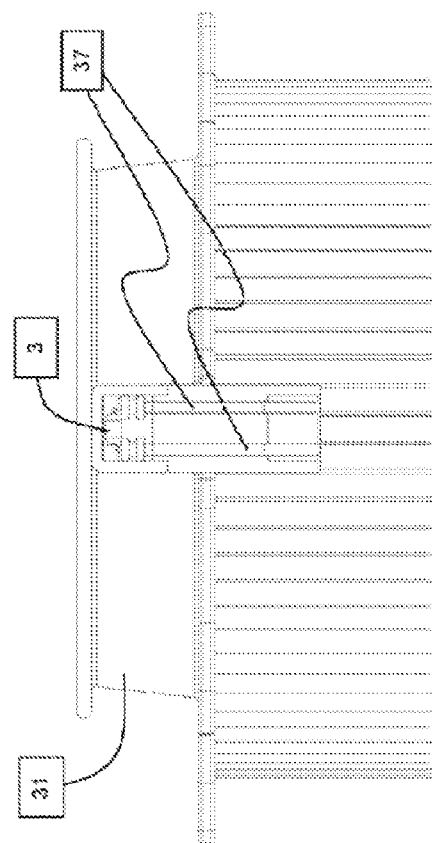
Figure 4B:
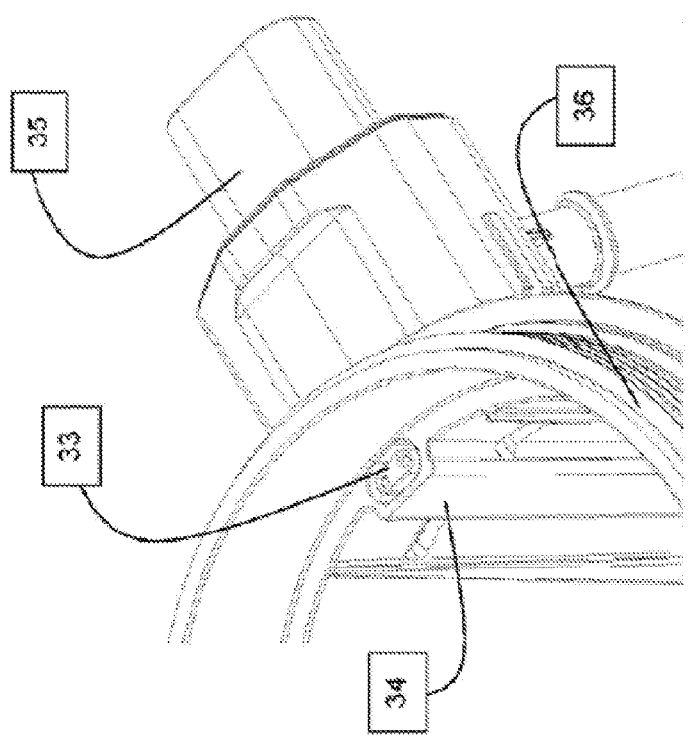
Figure 4D:
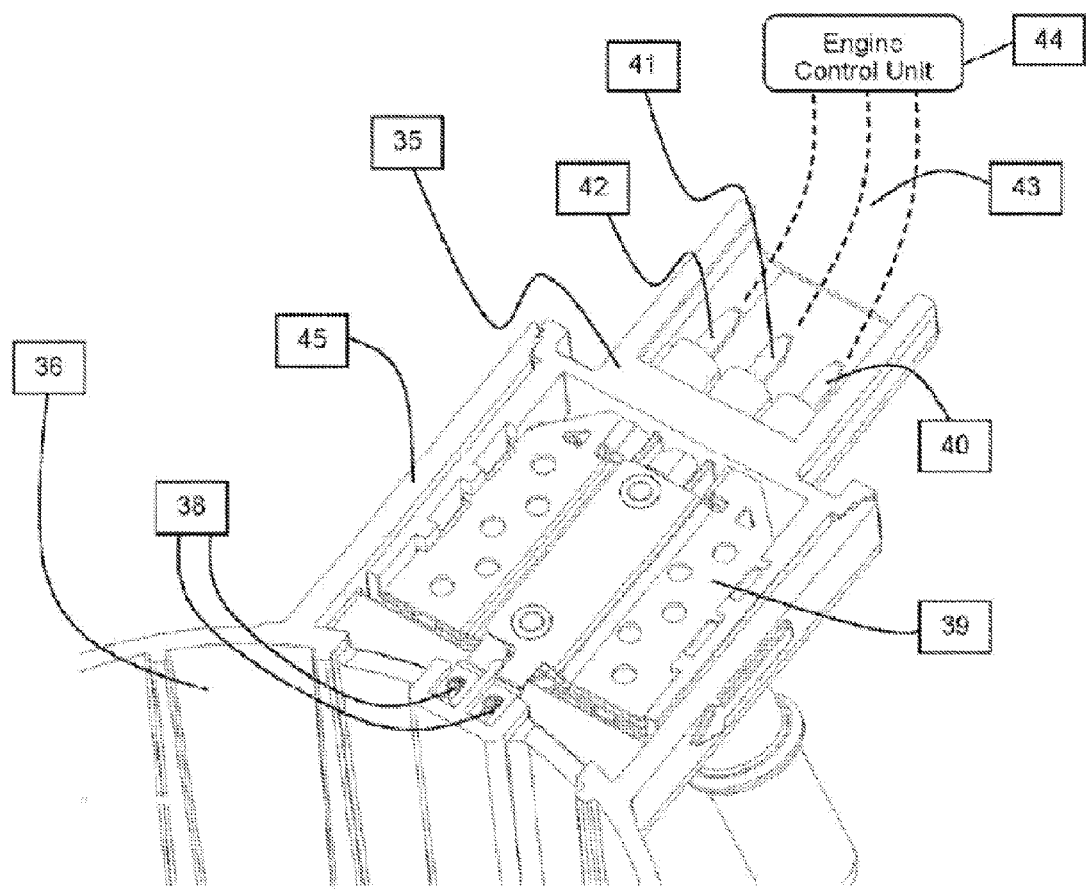

Referring to FIGS. 4A-4D, an alternative filter cartridge element 30 is shown. In the filter cartridge element 30, the resistor 3 is integrated in an extension 32 of the top endplate 31 of a cartridge filter element 30. The electrical connection of this resistor can be established with the ECU through any means, however, particular to this example, the connection is shown to be made through an existing heater assembly 35 integrated on the shell housing 36 of the filter cartridge element 30 as shown in FIG. 4B. The heater assembly 35 includes a heating element. The resistor 3 is built integrated in the top endplate 31 through any means such that two pins 37 are electrically connected to the resistor as shown in FIG. 4C. The two pins 37 form a wiring harness. The location of the resistor 3 shown in this example is on the side of the top endplate 31, however, it could be permanently attached to any side of the endplate (side, top, bottom, etc.) as long as an electrical connection through wiring harnesses 43 is available to be made to the ECU 44. On the filter shell housing 36 a protrusion 33 provides for female connector to which the connector pins 37 from the top endplate can be connected. As shown in FIG. 4D, the protrusion 33 on the shell has two metal crimps 38 integrated in the female sockets, which in turn are connected to a metal connection plate 39 on the heater assembly, which in turn is electrically connected to the male pin 40 of the heater assembly 35. In such an arrangement, the heater 35 is shown to be used with an additional pin connection 40 to provide for the added filter electronic recognition feature. The other two pins 41 and 42 in the heater assembly 35 are used for the intended purpose of electrically heating the fluid to be filtered by the filter cartridge element 30. Thus, a new heater-cum-filter recognition assembly 35 is proposed, which can be connected to the mounting boss 45 of the housing body 36.

Upon installation of the filter cartridge element 30 into the housing body 36, the resistor 3 forms an electrical connection to the ECU 44 via the male pins 37 on the top endplate 31, then to the female connector crimps 38, the metal plate 39, the heater pin 40 and then through the wiring harness 43. The ECU 44 can thus detect the presence of the filter cartridge through a set voltage range, when powered as described above.

"Electronic filter recognition feature" through Ohm's law by integrating a resistor in the body of the filter, is disclosed. Resistor-based filter recognition feature can be applied to fuel-water separators, fuel/lube/hydraulic filters, or cartridge style filter modules. Design examples are shown to integrate the resistor as built into the body of the filter, or through a recognition module example. Examples of type of connections made to the ECU are disclosed. For fuel-water separator filter assemblies, the water-in-fuel sensor is used as a filter recognition device (with slight modifications where necessary), which is improved functionality of the WIF sensor. The WIF function is still active irrespective of presence or absence of the recognition feature. For the particular example of fuel modules with heater, a unique design of heater is proposed which has an added pin and plates configuration to provide the functionality of filter recognition along with the heating function.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A filter assembly comprising:
   a filter element configured to filter a fluid;
   a filter housing for the filter element;
   a sensor having sensing probes;
   an electrical circuit having a first portion located within the filter housing and a second portion coupled to the filter element, wherein installing the filter element in the filter housing electrically connects the first and second portions of the electrical circuit via the sensing probes; and
   a control circuit that determines whether the filter element installed in the housing is a designated type of filter element based upon a first determined voltage of the electrical circuit and at the same time detects accumulated water in the filter housing by detecting a second voltage across the sensing probes.

2. The filter assembly of claim 1, wherein the sensor is a water-in-fuel sensor, and wherein the electrical circuit is part of the water-in-fuel sensor.

3. The filter assembly of claim 1, wherein the electrical circuit is part of an electronic filter recognition module.

4. The filter assembly of claim 1, wherein the electrical circuit comprises a resistor.

5. The filter assembly of claim 4, wherein the resistor is integrated with the filter element.

6. The filter assembly of claim 4, wherein the resistor is integrated with the filter housing.

7. A filter assembly comprising:
   a housing;
   a mounting boss coupled to the housing;
   a sensor coupled to the housing, the sensor including a first electrical probe and a second electrical probe extending through the mounting boss and into an interior of the housing;
   a resistor electrically connected to the first electrical probe and the second electrical probe such that the first electrical probe, the resistor, and the second electrical probe form part of an electrical circuit; and
   a control unit that determines whether a first voltage across the first electrical probe and the second electrical probe is within a predetermined voltage band that indicates a genuine filter is installed within the housing and at the same time detects accumulated water in the housing by detecting a second voltage across the first electrical probe and the second electrical probe.

8. The filter assembly of claim 7, wherein the resistor is electrically connected to the first electrical probe with a first conducting plate having a first pin slot.

9. The filter assembly of claim 8, wherein the resistor is electrically connected to the second electrical probe with a second conducting plate having a second pin slot.

10. The filter assembly of claim 7, wherein the sensor is a water-in-fuel sensor.

11. The filter assembly of claim 7, wherein the control unit is an engine control unit.

12. A filter assembly comprising:
    a housing;
    a replaceable filter element positioned within the housing, the replaceable filter element including a filter media, a top endplate, a bottom endplate, and a resistor module, the resistor module including a resistor electrically coupled to a first pin and a second pin;
    a sensor coupled to the housing, the sensor including a first sensor probe and a second sensor probe, wherein the first sensor probe contacts the first pin and the second sensor probe contacts the second pin when the filter element is positioned within the housing; and
    a control unit electrically connected to the resistor, the control unit determines whether a first voltage across the first sensor probe and the second sensor probe is within a predetermined voltage band that indicates that the replaceable filter element installed within the housing is a genuine replacement filter element and at the same time detects accumulated water in the housing by detecting a second voltage across the first electrical probe and the second electrical probe.

13. The filter assembly of claim 12, wherein the resistor module is coupled to one of the top endplate or the bottom endplate.

14. The filter assembly of claim 12, wherein the resistor is electrically connected to the first sensor probe with a first conducting plate.

15. The filter assembly of claim 14, wherein the resistor is electrically connected to the second sensor probe with a second conducting plate.

16. The filter assembly of claim 12, wherein the sensor is a water-in-fuel sensor.

17. The filter assembly of claim 12, wherein the control unit is an engine control unit.

18. A filter assembly comprising:
a housing;
a replaceable filter element positioned within the housing, the replaceable filter element including a filter media, a top endplate, a bottom endplate, and a resistor module, the resistor module including a resistor;
a heater coupled to the housing, the heater configured to electrically heat a fluid to be filtered by the filter assembly, the heater including a wiring harness in electrical communication with the resistor; and
a control unit electrically coupled to the heater through the wiring harness, the control unit configured to determine whether a first voltage across the resistor is within a predetermined voltage band that indicates that the replaceable filter element installed within the housing is a genuine replacement filter element.

19. The filter assembly of claim 18, wherein the resistor module is coupled to an extension of one of the top endplate or the bottom endplate.

20. The filter assembly of claim 18, wherein the control unit is an engine control unit.

21. A filter element comprising:
filter media;
a top endplate coupled to a first end of the filter media;
a bottom endplate coupled to a second end of the filter media; and
a resistor module including a resistor electrically coupled to a first pin and a second pin, wherein when the filter element is inserted into a housing of a filter assembly, the first pin and the second pin form an electrical circuit with a control unit such that the control unit can measure a voltage drop across the resistor via a heating element.

22. The filter element of claim 21, wherein the resistor module is coupled to one of the top endplate or the bottom endplate.

23. The filter element of claim 21, wherein:
the first pin is configured to couple to a first sensor probe of a sensor coupled to the housing;
the second pin is configured to couple to a second sensor probe of the sensor; and
the control unit is electrically coupled to the sensor.

24. A filter element comprising:
filter media;
a top endplate coupled to a first end of the filter media;
a bottom endplate coupled to a second end of the filter media; and
a resistor module including a resistor and a resistor module wiring harness, wherein when the filter element is inserted into a housing of a filter assembly, the wiring harness forms an electrical connection with a heating element wiring harness such that a control unit can measure a voltage drop across the resistor.

25. A filter assembly comprising:
a filter element configured to filter a fluid;
a filter housing for the filter element;
an electrical circuit having a first portion located within the filter housing and a second portion coupled to the filter element, wherein installing the filter element in the filter housing electrically connects the first and second portions of the electrical circuit; and
a control circuit that determines whether the filter element installed in the housing is a designated type of filter element based upon a determined voltage of the electrical circuit;
wherein the electrical circuit is part of a heater assembly.

* * * * *